Oct. 7, 1924. 1,510,817

F. BAKER

PITMAN CONNECTION FOR MOWING MACHINES

Filed Nov. 23, 1922

WITNESSES

INVENTOR
Frank Baker.
BY
ATTORNEYS

Patented Oct. 7, 1924.

1,510,817

UNITED STATES PATENT OFFICE.

FRANK BAKER, OF ALDERSON, WEST VIRGINIA.

PITMAN CONNECTION FOR MOWING MACHINES.

Application filed November 23, 1922. Serial No. 602,881.

*To all whom it may concern:*

Be it known that I, FRANK BAKER, a citizen of the United States, and a resident of Alderson, in the county of Monroe and State of West Virginia, have invented certain new and useful Improvements in Pitman Connections for Mowing Machines, of which the following is a specification.

This invention relates to an improvement in pitman connections for mowing machines.

The object of the invention is to provide an improvement of this character wherein the socket members or jaws employed for connecting the pitman rod to the ball bearing of the knife head of the cutter bar may be positively spread or forced apart when desired in order to permit of the ready and convenient detachment of the cutter bar for purposes of replacement and repair.

Another object is to provide an improvement of this character wherein the same means employed for expanding or spreading the socket members of the jaws may also be advantageously employed for contracting or urging the jaws into operative engagement with the ball bearing of the knife head of the cutter bar.

Another object is to provide an improvement of this character and having these advantages and which at the same time is of simple and durable construction, reliable in operation, easy to manufacture and comparatively inexpensive to manufacture and apply.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1:
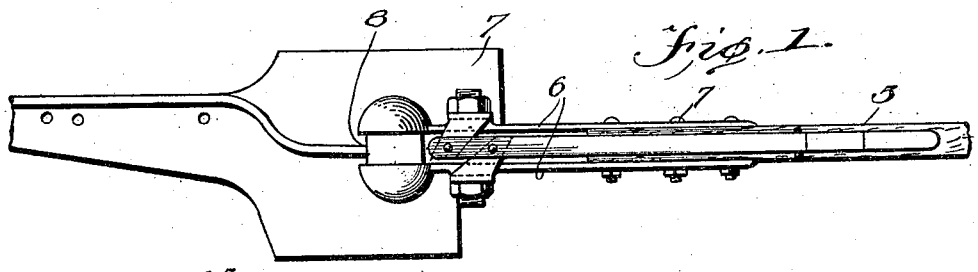
Figure 1 is a fragmentary view in plan, showing the invention applied.

Referring to the drawings wherein for the sake of illustration is shown the preferred embodiment of the invention, 5 designates the pitman rod to which the socket members 6 are secured, as at 7, in the usual manner. These socket members 6 are of conventional construction and coact with a ball bearing 8 carried by the knife head 7 of the cutter bar. Each socket member or jaw 6 carries a lug 10, the lug of one socket member extending toward the other and the lugs being oppositely inclined or deflected. As clearly shown in Figure 2 the lugs 10 lie in substantially the same plane and are spaced longitudinally but overlap each other transversely. These lugs 10 are of identical construction though oppositely arranged and each has integrally formed therewith and extending at right angles thereto and attaching plate 11 which lies flush against the portion of the socket member 6 with which its lug is connected. Each attaching plate 11 is apertured at 12, the apertures of the attaching plate being alined with a bolt hole 13 provided in the socket member with which it is associated. A bolt 14 is extended through the bolt hole 13 and aperture 12 and coacts with a nut 15 to clamp the attaching plate and consequently the lug in position on its socket member.

Each lug 10 has upstanding or projecting therefrom a pivot stud 16 and in the assembly the pivot studs 16 lie in the longitudinal axis of the pitman rod and are extended through openings provided therefor in an operating lever or bar 20 whereby the lever 20 is pivotally connected to the lugs 10. The heads of the studs are burred or swaged over after the manner of a rivet so that displacement of the operating lever is prevented. The end of the operating lever opposite to that which is associated with the studs 16 is offset, as at 21, to facilitate handling of the lever and adjacent this offset portion the lever carries a pawl or tooth 22 which coacts with a ratchet or serrated plate 23 fixed by screws or the like to the pivot rod 5. The operating lever 20 is constructed of metal having sufficient resiliency to enable the same to be flexed so as to disengage the tooth 22 from the ratchet plate 23 when it is desired to impart adjustment or manipulate the lever 20.

Figure 2:
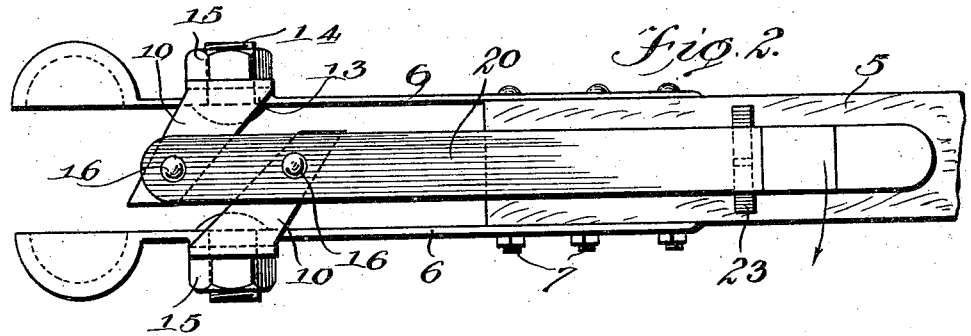
Figure 2 is a fragmentary view in plan, showing the device mounted on the pitman rod but omitting any showing of the cutter bar.
Figure 3:
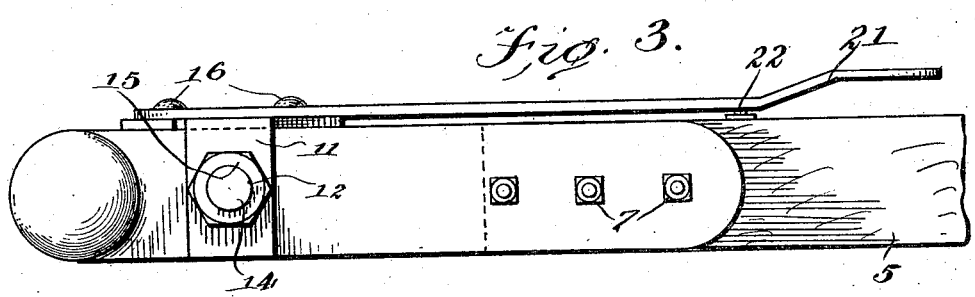
Figure 3 is a fragmentary view in side elevation but otherwise similar to Figure 2.
Figure 5:
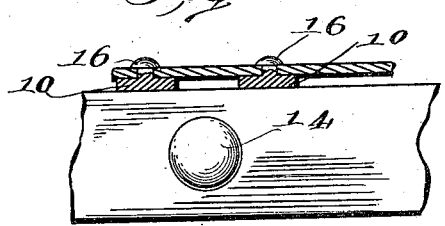
Figure 5 is a detail view in section on line 5—5 of Figure 2.
Figure 4:
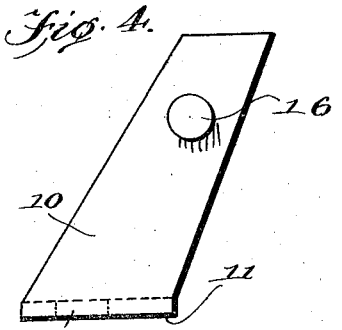
Figure 4 is a plan view, showing the details of one of the pivot lugs and its attaching plate.

When the lever 20 is flexed and shifted in a clockwise direction as indicated by the arrow in Figure 2 it will impart a spreading or expanding movement to the jaws 6 through the lugs 10 and the studs thereof which coact with the lever. Moreover the spreading or expanding movement will be equally imparted to each socket member since the attaching plates of the lugs are opposed or transversely alined in assembly. When the socket members have been expanded or spread to the desired degree they may be locked in such position by engaging the tooth 22 with the ratchet plate 23. Similarly when it is desired to contract or urge the socket member 6 into engagement with the ball bearing 8 the lever 20 is flexed and shifted in a counterclockwise direction, as viewed in Figure 2 so as to swing the jaws toward each other and into engagement with the ball bearing 8 which is of course positioned between the socket members 6.

I claim:

1. In combination, a pitman connection including socket members, a lug carried by each socket member and extending toward the other socket member, said lugs being oppositely inclined, and means cooperable with the lugs for positively expanding and contracting said socket members.

2. In combination, a pitman connection including socket members, a lug carried by each socket member and extending toward the other socket member, said lugs being oppositely inclined and an operating bar pivotally connected to each lug, and releasable locking means for holding the operating bar in adjusted position.

3. In combination, a pitman connection including socket members, a lug carried by each socket member and extending toward the other socket member, said lugs being oppositely inclined and an operating bar pivotally connected to each lug.

4. In combination, a pitman connection having socket members, a lug for each socket member, each lug having an attaching plate engaging each socket member and a bolt and nut for holding the attaching plate to its socket member, the lugs being oppositely inclined and the attaching plates being oppositely arranged or alined, each of said lugs having a stud projecting therefrom, and an operating bar pivotally connected to studs and lugs.

5. In combination, a pitman connection having socket members, a lug for each socket member, each lug having an attaching plate engaging each socket member, a bolt and nut for holding the attaching plate to its socket member, the lugs being oppositely inclined and the attaching plates being oppositely arranged or alined, each of said lugs having a stud projecting therefrom, an operating bar pivotally connected to studs and lugs, and cooperating means between the operating bar and the pitman rod for releasably locking the operating bar in adjusted position including a tooth carried by the operating bar and a ratchet plate carried by the pitman rod, the tooth being engageable with the ratchet plate and the operating bar being adapted to be flexed for disengaging the tooth from the ratchet plate when it is desired to shift the same.

FRANK BAKER.